United States Patent [19]
Van Santen et al.

[11] 3,713,971

[45] Jan. 30, 1973

[54] NUCLEAR REACTOR HAVING A MODULAR CORE

[75] Inventors: Aart Van Santen; Bengt Sodergard, both of Vasteras, Sweden

[73] Assignee: Allmanna Svenska Electriska Aktiebolaget, Vasteras, Sweden

[22] Filed: Dec. 1, 1969

[21] Appl. No.: 881,113

[30] Foreign Application Priority Data

Dec. 2, 1968 Sweden ........................ 16409/68

[52] U.S. Cl. .................. 176/50, 176/36, 176/78, 176/30, 176/35
[51] Int. Cl. ............................................. G21c 15/00
[58] Field of Search ....... 176/36 R, 36, 44, 35, 50, 30

[56] References Cited

UNITED STATES PATENTS

3,481,832  12/1969  Rickert .................................. 176/78

Primary Examiner—Reuben Epstein
Attorney—Jennings Bailey, Jr.

[57] ABSTRACT

A nuclear reactor includes a reactor core and a pressure vessel surrounding the reactor core. A plurality of tubes pass through the bottom part of the vessel and extend towards the core. These tubes have upper ends forming guide tubes for control rods. The core is formed of a plurality of core units each comprising a fuel assembly and a rod movable in one of the control rod guide tubes. The fuel assemblies are substantially polygonal in cross section and are arranged in a polygonal lattice. Each of the fuel assemblies rests on a separate control rod guide tube. The fuel assemblies are arranged close together with at most only a small gap between them and are laterally supported by the adjacent fuel assemblies and the control rod guide tubes.

18 Claims, 27 Drawing Figures

Fig.1  Fig.4

INVENTOR
AART VAN SANTEN
BY
BENGT SÖDERGARD

INVENTOR
ARNT VAN SANTEN
BY
BENGT SÖDERGÅRD

INVENTOR.
AART VAN SANTEN
BY BENGT SÖDERGÅRD

INVENTOR.
AART VAN SANTEN
BY
BENGT SÖDERGÅRD

INVENTOR
AART VAN SANTEN
BY
BENGT SÖDERGÅRD

NUCLEAR REACTOR HAVING A MODULAR CORE

Background of the Invention

1. Field of the Invention
2. The Prior Art

U.S. Pat. application Ser. No. 723,061 to B. Södergård, filed on April 22, 1968 entitled "Guide tube for a control rod in a nuclear reactor" describes an embodiment in which each control rod guide tube has a separate block in which four fuel assemblies can be placed, thus forming a cruciform gap for a central control rod having cruciform cross-section. Each fuel assembly has at its upper end four control springs which support the assembly laterally against a core grid which has a square mesh for each fuel assembly. Thus each fuel assembly must be surrounded by a gap having a minimum width which is determined by the core grid. In order to approach as nearly as possible an ideal core, the width and number of the gaps should be minimized.

SUMMARY OF the invention

The present invention relates to a nuclear reactor comprising a reactor core surrounded by a reactor pressure vessel having a bottom part, a plurality of tubes passing through the bottom part and extending towards the core, said tubes having upper ends forming guide tubes for control rods, said core consisting of a plurality of core units, each of which comprises a fuel assembly and one of said control rods arranged in the same longitudinal direction as the control rod guide tubes, said fuel assemblies having substantially polygonal cross-section and being arranged in a polygonal lattice shape. One object of the invention is, in a reactor of this type, to build up a core in which the necessary gaps have been minimized. This is made possible by having each of the fuel assemblies resting on a separate control rod guide tube, said fuel assemblies being arranged close together with substantially no gap, and at most only a small gap laterally between them, said fuel assemblies being laterally supported by adjacent fuel assemblies and their respective control rod guide tubes. The core grid is thus omitted in this construction which means that when dimensioning the gap between two adjacent fuel assemblies it is only necessary to take into consideration that it must be possible to exchange any core unit.

Further, as is known, slim construction elements such as fuel assemblies are never completely straight. There is always a certain deviation from complete straightness deriving from the manufacture The already negligible gap between the fuel assemblies will therefore be reduced at some points so that, at least when the reactor is in operation, the fuel assemblies will abut and support each other. Themoderator tank has preferably, but notnecessarily, circular cross-section so that it can take up pressure differences between the inside and the outside with minimal deformation. So that the outer fuel assemblies in the core, at least when the reactor is in operation, can obtain support from the inner wall of the circular moderator tank, this tank is provided with atleastone support memberprojecting in against the fuel assemblies, for example in the form of a ring, the inner edge of which supplements the cross-sectional contour of the core, or in the form ofinwardly projecting plates running substantially axially or at an acute angle along the fuel assemblies. These forms ofsupport member may also becombined.

In order to increase further the mechanical stability of the core, it is advantageous in one embodiment in which each fuel assembly comprises a shroud having substantially polygonal cross-section surrounding a fuel rod bundle with a large member of parallel fuel rods arranged in a pplygonal lattice, for the sides of the shroud to be corrugated to follow substantially the contours of the fuel rods, said corrugated sides of said shrouds engaging in the corrugated sides of adjacent shrouds. Thus the disturbance in the core lattice when passing from one fuel assembly to anotheris considerably reduced and the resistance to bending of the shroud in longitudinal direction is increased advantageously. Resistance to beinding laterally is reduced and thus an over-pressure inside the fuel assembly in comparison with the surrounding gap deforms the shroud elastically more easily than before so that the already negligible gap becomes almost non-existent.

In order to furtherreduce disturbances causedin the core lattice by the control rods, it is suitable to remove a number of fuel rods from an at least substantially homogenous rod lattice and replace them by absorber finger guide tubes, and let each control rod be a finger-type control rod comprising a plurality of absorber fingers having lower ends, a holding means and a first coupling part, said fingers being of equal length and carried at said lower ends by saidholding means, said means carrying said first coupling part for coupling to a second coupling part carried by a driving means for the control rod. Conventional boiling light water reactors having control rods with cross-shaped cross-section insertable from below have a bayonet coupling for this coupling, which is disengaged by turning the control rod after the four surrounding fuel assemblies have been removed. There are certain difficultiesinvolvedin using a bayonet-coupling with fingertype control rods and instead a remote-controlled coupling should be used. It is thus suitable for one of said coupling parts to have substantially radially movable coupling elements and the other coupling part to have counter elements for engagement with said radially movable coupling elements, said coupling part of said holding means being provided with a central rod having an upper and a lower end, said upper end, when the absorber fingers are completely inserted into said fuel assembly, projecting axially from an upper end of said fuel rod bundle, and said lower end forming a locking member for said radially movable coupling elements when these are in an engagement position, said central rod having a lower locking position from which it is axially movable upwards to disengage said coupling.

It is suitable for the lower end of the central rod to be shaped as a locking head, a spring pressing said locking head down towards said locking position, a stop preventing said locking head from being moved further down than to said locking position, and at least one shoulder located at said upper end of the central rod and at least partially facing downwards, said shoulder providing a grip for a lifting tool to lift said rodfrom said locking position. If the central rod is lifted even further, the core unit will be lifted.

It is advantageous for at least some of the absorber fingers to have upper end parts which, when said absorber fingers are completely inserted into said fuel assembly, project axially from the upper end of the fuel rod bundle, each such upper end part carrying a shoulder facing at least partially downwards, said shoulder providing a grip for a lifting tool to lift said core unit. The lifting stresses on the central rod are thus reduced.

In order to distribute the lifting stresses over the absorber fingers it is suitable for the upper end parts to be axially resiliently connected to the absorber fingers.

The central rod runs inside the fuel rod bundle in a guide tube which is arranged on a central fuel rod position in the lattice. Both this guide tube and the guide tubes for the absorber fingers are preferably provided with inlet throttling means giving a substantially constant flow of coolant through said guide tube irrespective of how far the central rod is withdrawn with respect to said fuel rod bundle.

The absorber fingers may be shaped as rods or tubes. In the first alternative, which is easiest to manufacture, the solid absorber fingers are cooled on the outside and the cooling gap to the guide tube must therefore have a certain minimum width. This width can be reduced in the alternative with tubular absorber fingers since a considerable part of the coolant can be led inside the absorber finger. An asorber finger is thus obtained which is less fragile.

In order to exploit fully the possibilities offered by the invention to reduce the disturbing influence of the gaps between the assemblies and also decrease the number of driving means for control rods, the fuel assemblies should be made considerably larger than at present, for example with three to seven times as many fuel rods. Apractical lower limit is set by the radial extension of the control rod driving means and an upper limit by the risk of flow instability in large assembly cross-sections. If these large fuel assemblies wereconventionally designed they would cause serious reactivity problems upon fuel exchange. As in conventional fuel assemblies, the fuel assembly in the core unit comprises a plurality of spacers arranged at different levels and firmly attached to the absorber finger guide tubes, said spacers comprising elastically yielding members resiliently abutting each of said fuel rods at at least three contact points on each spacer level. Said fuel assembly further comprises a transverse support member, for example a bottom plate, rigidly attached to said shroud at a level immediately below said lower ends of the fuel rods and permitting the passage of coolant. According to the invention the fuel rods areinserted through the spacers to contact an upperside for said transverse support member, each fuel rod being heldin an intended position solely by said spacers and said transverse support member. Furthermore, each fuel rod has an upper end part carrying at least one shoulder facing at least partially downwards, said shoulder providing a grip for a lifting tool for extracting said fuel rod, thus enabling each individual fuel rod to be exchanged both separately and in a group. In this eay an arbitrary number of irradiated fuel rods, preferably evenly distributedacross the assembly cross-section, can be drawn out of their positions and replaced by new ones. This system of partial fuel exchange within the fuel assembly offers great possibilities, with a minimum of precautions, to decrease local variations in the reactivity increase following a fuel exchange operation.

The transverse support member suitably consists of a perforated plate, the absorber fingerguide tubes being rigidly attached to this plate. The perforation serves only to allow coolant to pass and it is unnecessary to arrange holes accurately positioned for the lower ends of the fuel rods, since the rod ends only rest against the upper side of the plate. The top plate usually found in conventional fuel assemblies is replaced by a spacer to enable exchange of an arbitrarily selected fuel rod.

Advantageously the majority of the fuel assemblies have an elongated neutron flux measuring probe in a corner position of thepolygonal fuel rod lattice. All the probes are identically orientedin relation to the respective fuel assembly, said probes being distributed evenly over said core and each probe being axially movable into and out of thefuel assembly. The probe isinserted from belowwhen the assembly is in position.

So that the absorberfingers shall be sufficiently strong when a control rod is rapidly inserted, they may in certain cases have to be made so thick that an absorber finger cannot fit into a fuel rod position. According to the invention this is avoided since the absorber fingers in each control rod, during insertion into said fuel assembly, are supported laterally by at least one guide member, for example a guide plate, which is movable in said control rod guide tube between an upper end position and a lower end position. The risk of buckling need not be considered, therefore, when selecting the diameterof the absorberpins. The guide member suitably comprises a grid-like guide plate.

If, for example, one movable guide plate is required, it is arranged so that its lower end position is situated at approximately half the distance travelled by the absorber fingers, below the fuel assembly. During insertion of the absorbers, the fingerholder is moved up to touch the movable guide plate which, when the absorber fingers are inserted further, rests on the finger holder and moves up with it. At least one rod, either the central rod, or any absorber finger may be provided with a small stop or the like for the movable guide plate to ensure that this always returns down with the absorber fingers. In order to decrease theimpact when upon insertion at full speed for an emergency shutdown, the finger holder hits the movable guide plate, it is advantageous to provide the finger holder and the control plate with supplementary cooperating members which together form a simple hydraulic shock absorber. Alternatively, the attachment plate or the guide plate may be provided with at least one spring member.

BRIEF DESCRIPTION OF THE DRAWINGS the invention will be further described with reference to the accompanying drawings.

FIG. 10 shows schematically, partly in longitudinal section, an alternative ball-coupling in blocked position and FIG. 11 the same ball-coupling in open position.

FIGS. 12a-f shows views of alternative embodiments of upperend parts of the absorberfingers, the fuel rods or the central rod.

DESCRIPTION OF THE PREFERRED EMBODIMENTS

Figure 1:
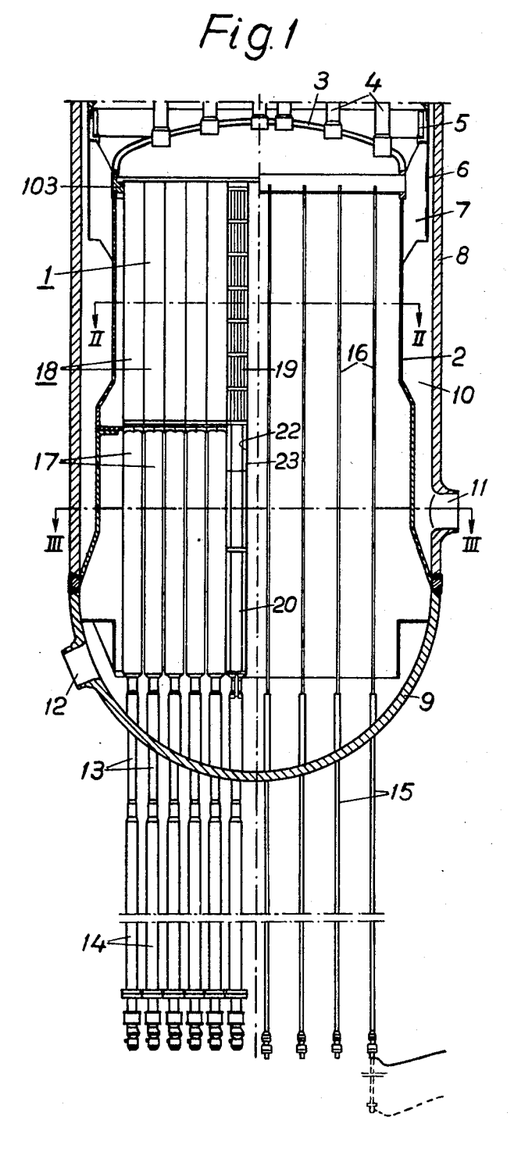
FIG. 1 shows the lower part of a boiling light water reactor in simplifiedlongitudinal section.
Figure 2:
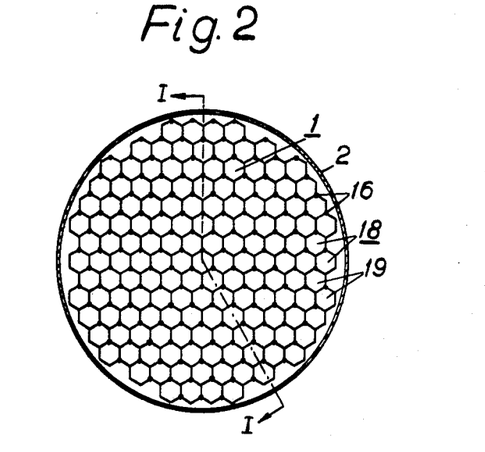
FIG. 2 shows a cross-section through the core along the line II—II in FIG. 1.
Figure 3:
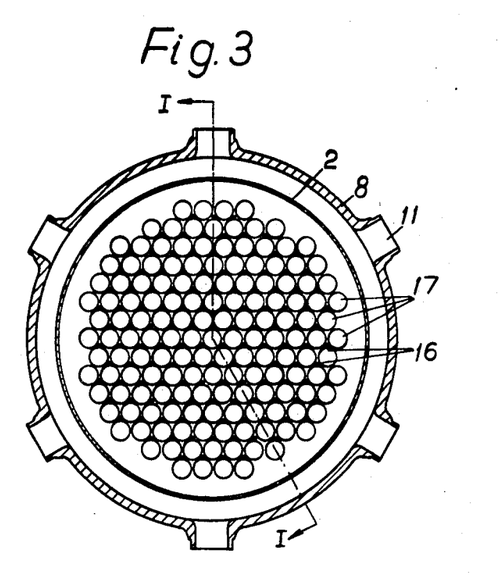
FIG. 3 shows a cross-section under the core along the line III—III in FIG. 1.
Figure 4:
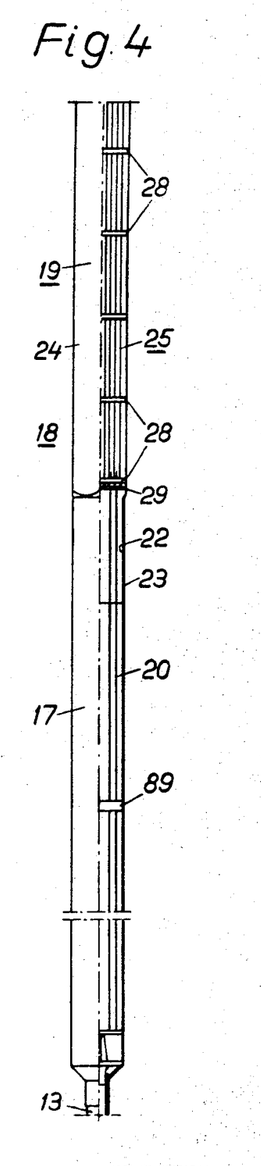
FIG. 4 shows, partly in longitudinal section, a core unit standing in a control rod guide tube.

The reactor shown in FIGS. 1 –3 is a boiling light water reactor with forced circulation and internal steam-separation. The core 1 of the reactor is surrounded by a moderator tank 2 with a doubled-walled lid 3. In the lid 3 are a number of steam-separators 4. The core superstructure is constructed in substantially the manner shown in U.S. Pat. application, Ser. No. 704,938 to B. Södergård entitled Attachment means for the superstructure above the core in a light water boiling reactor filedon Feb. 12, 1968, and assigned to the present assignee. A feed-water sparger 5, which distributes the feed water supplied, is supported by a feed-water shroud 6 which, by means of a plurality of radially directed plates 7, is anchored to the moderator tank 2. The moderator tank 2 is in turn surrounded by a reactor pressure vessel 8 with a bottom part 9. Between the moderator tank 2 and the reactor pressure vessel 8 is a gap 10 from which circulating water is taken out through a plurality of connections 11 to circulation pumps, not shown, from where the wateris returned through a plurality of connections 12. If desired, circulation pumps inside the reactor may be used, in this case preferably being arranged in the manner described in U.S. Pat. application, Ser. No. 857,868 to Lars Leine et al. entitled Nuclear reactor having internal pumps filed on Sept. 15, 1969 and assigned to the present assignee. A large number of parallel vertical tubes pass through the bottom part 9. These tubes comprise leading-in tubes 13 for driving means 14 for control rods and leading-in tubes 15 for neutron flux measuring probes 16. The upper ends of the leading-in tubes or the guide tubes 13 for the control rod drives are situated at the same level and carry control rod guide tubes 17 of the same length. Each control rod drive 14 comprises an electric motor, a screw and a nut for normal operation of the appropriate control rod, and is provided with a scram function. Preferably a drive in accordance with that described in Swedish Pat. No. b 314,749 is used.

Figure 5A:
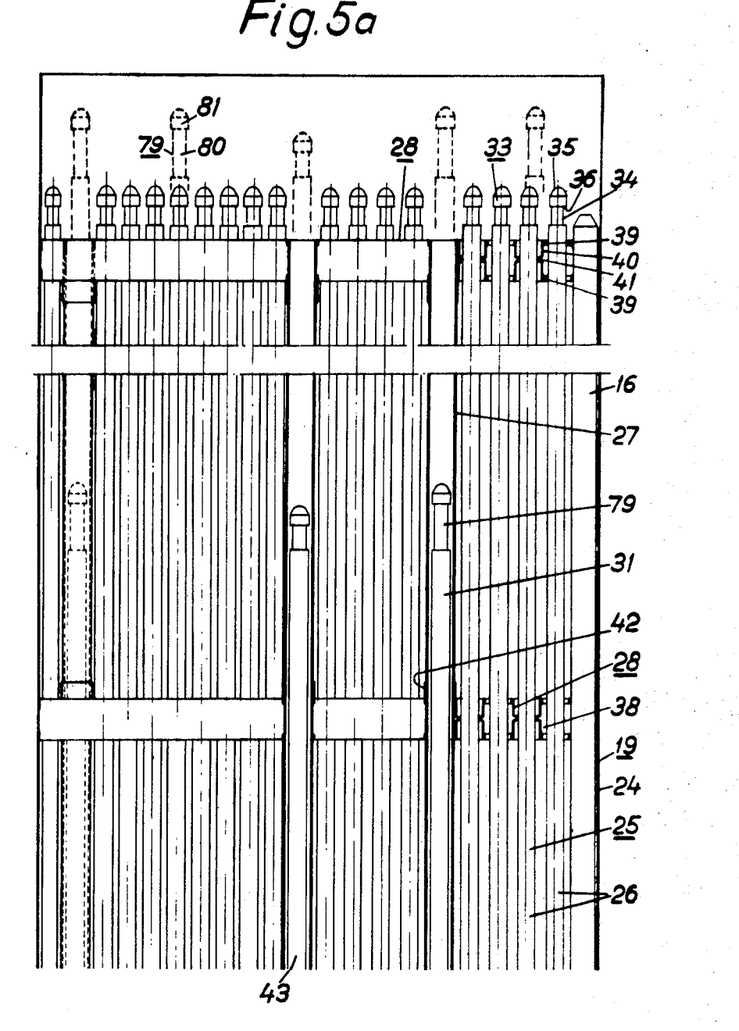
FIGS. 5a–d show on a largerscale a longitudinal section through the core unit standing in the control rod guide tube.
Figure 5B:
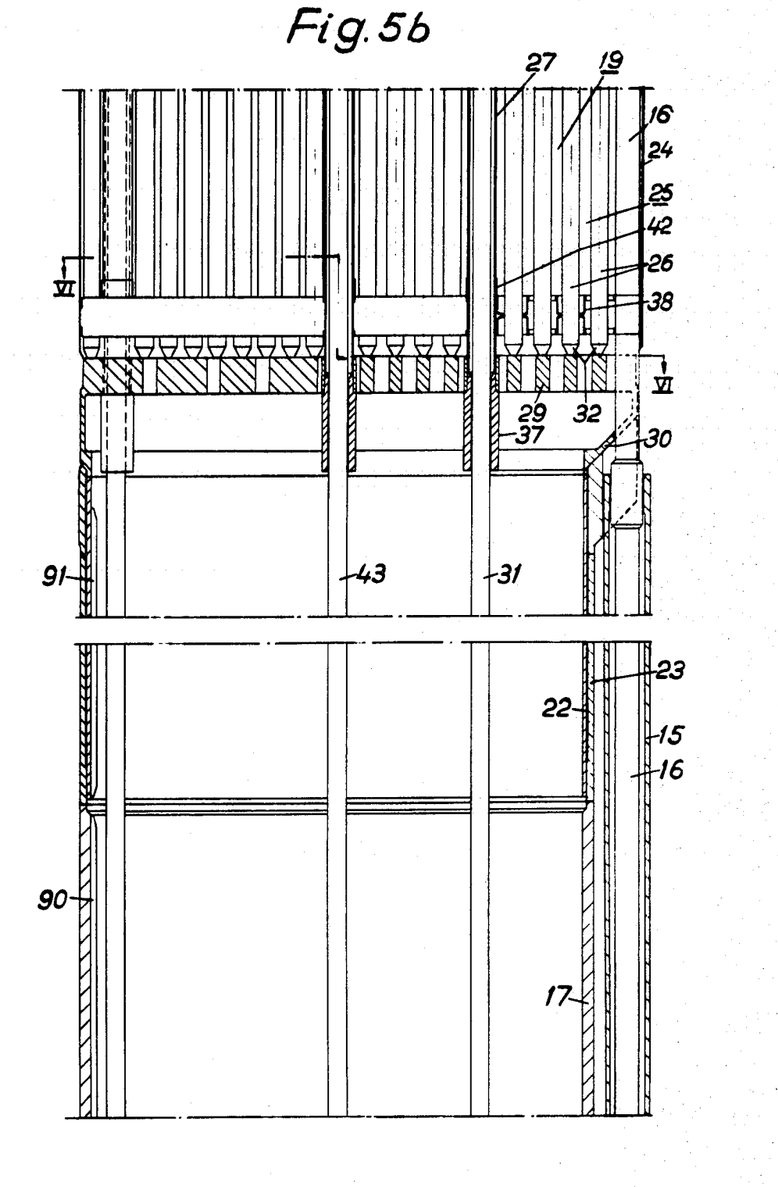
Figure 17:
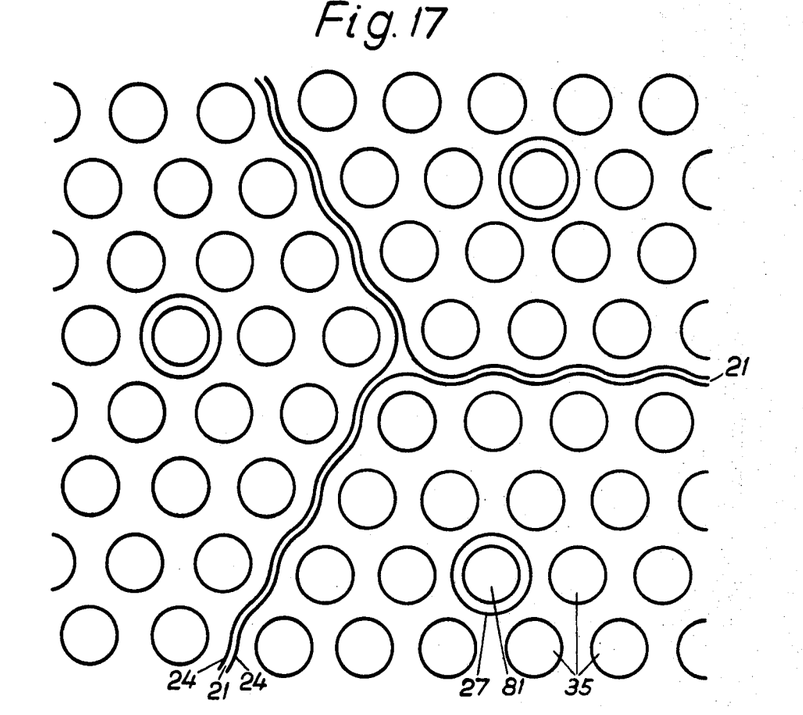
FIG. 17 shows an upper end view of three adjoining fuel assembly corners.

The core 1 is built up ofvertical coreunits 18, equivalent in number to the number of control rod guide tubes 17. Each core unit 18 comprises a fuel assembly 19 with substantially hexagonal cross-section and a finger-type control rod 20 arranged to operate inside the assembly 19 by insertion upwards and withdrawal downwards. The fuel assemblies 19 are arranged close together with only a small gap 21 (FIG. 17) between each other. As shown more clearly in FIGS. 5 and 5b, each fuel assembly 19 is provided with an elongate lower end part 22 projecting axially downwards which, when the fuel assembly 19 has been lowered to the intendedposition in the core 1, cooperates with an upper end part 23 arranged at the upper end of each control rod guide tube 17 in such a way that the fuel assemblies 19 only rest standing in the control rodguide tubes 17 and are supported laterally only by these control rod guide tubes 17 and, at least when the reactor is in operation, by each other except for the fuel assemblies 19 adjacent to themoderator tank 2 which, at least when the reactor is in operation, aresupported at least indirectly by the moderator tank 2. Thus in this construction of the reactor there is no core grid arranged to guide the upper ends of the fuel assemblies, which means that the gaps 21 between thefuel assemblies can have a minimum width.

As is known, slim construction elementssuch as fuel assemblies arenever completely straight, but always deviate slightly from complete straightness due to manufacturing problems. The already negligible gap 21 between the fuel assemblies 19 will therefore be reduced at some points so that, at least when the reactor is in operation, thefuel assemblies 19 will abutand support each other. Themoderator tank 2 has preferably, but not necessarily, circular cross-section so that it can take up pressure differences between the inside and the gap 10 with minimal deformation. So that the outer fuel assemblies 19 in the core 1, at least when the reactor is in operation, can obtain support from the inner wall of the circular moderator tank 2, this is provided with at least one support member projecting in against the fuel assemblies 19, for example in the form of a ring 103, the inner edge of whichsupplements the cross-sectional contour of the core 1, or in the form ofinwardly projecting plates running substantially axially or at an acute angle along the fuel assemblies 19. These forms of support member may also be combined. The width of the gap 21 is suitable less than about 2 mm, preferably about 0.5 mm. A lower limit is set in practice by thedeviation from complete straightness of the fuel assemblies, since the contact pressure between adjacent fuel assemblies during shutdown of the reactor should not be so great that there is a risk, when lifting one core unit, of dragging along an adjacent core unit at the same time.

The fuel assembly 19 consists of a shroud 24 having substantially hexagonal cross-section, a fuel rod bundle 25 with a multitude of parallel vertical fuel rods 26 arranged in an equilateral triangular lattice, guide tubes 27 for absorber fingers 31 of the finger control rod 20, a plurality of spacers 28 arranged at different levels, a transverse perforated bottom plate 29, a transition part 30 for transition from hexagonal to circular cross-section and the above-mentioned elongate lower end part 22.

The shroud 24, which may also be omitted, may have a length of about 4 m and a wall-thickness of about 0.5 -2 mm, preferably about 0.6 -0.7 mm and consists of a zirconium alloy. Its upper end is drawn up over the upper end of the fuel rod bundle to facilitate theposi-tioning of a lifting tool when exchanging the coreunit. The sides of the shroud 24 are corrugated and follow the contours of the fuel rods 26. This corrugation increases the resistance to bending in longitudinal direction of the shroud 24. The resistance to beinding laterally is reduced and thus an over-pressure inside the fuel assembly 19 in comparison with the surrounding gap 21 deforms the shroud 24 elastically more easily than before so that the already negligible gap 21 becomes almost non-existent. A pressure difference of some tenths of a bar is sufficient to "blow up" the shrouds to abut each other. Furthermore, the corrugation of one shroud side engages with the corrugation of an adjacent shroud side (see FIG. 17), so thatthefuel assemblies partly lock each other and the mechanical stability of the core is increased. This is of particularly great value since, as mentioned, there is no core grid in this core design. The control rod guide tubes 17 have circular cross-section which fits well to the hexagonal cross-section of the shroud 24, thus enabling even distribution of the absorber fingers 31 over the cross-section of the assembly. Of course, shrouds having substantially square cross-section may also be used, in which case it is suitable for the control rod guide tubes 17 to have similar cross-section.

Figures 10, 11, 12A, 12B, 12C:
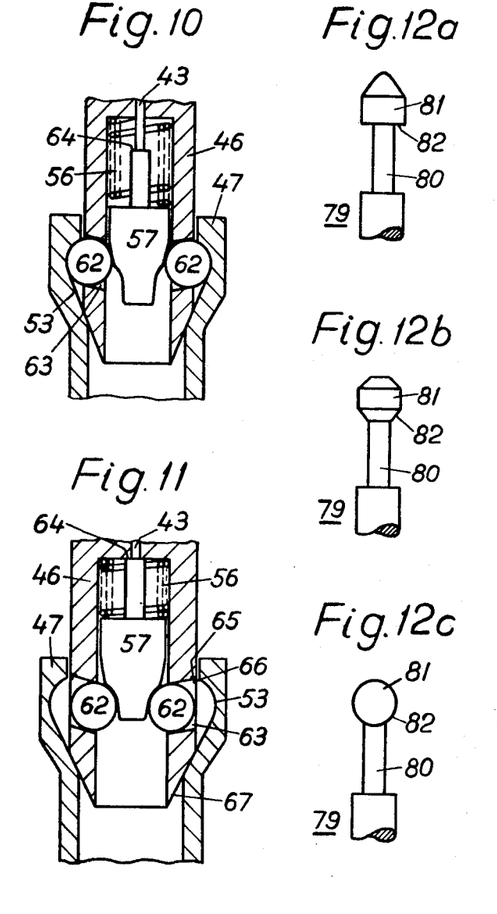
Figure 12D:
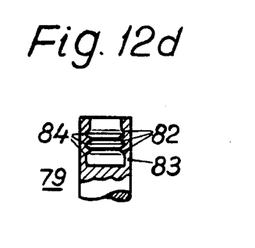
Figure 12E:
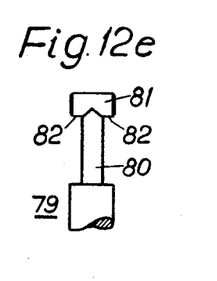

In the case shown the fuel assembly lattice comprises 331 possible fuel rod positions. Of these 305 are taken up by fuel rods, twenty-five by absorber finger guide tubes and one by the neutron flux measuring probe 16. The fuel rods 26 consist of enriched uranium dioxide pellets having diameter of about 10.5 mm, which are stakced in cladding tubes of a zirconium alloy and having a wall-thickness of about 0.8 mm. The cladding tubes are closed at the ends by lower and upper end plugs 32 and 33, respectively. The upperend plugs 33 have a neck part 34 and a head part 35 with downwardly directed shoulder 36 which gives a grip for a lifting tool to withdraw the fuel rod 26 from the fuel rod bundle. It is obvious that many other types of end plugs can offer a grip for a lifting tool to withdraw the fuel rod 26 from thefuel rod bundle. It is obvious that many other types of end plugs can offer a grip and some of these are shown in FIGS. 12s–e, *all ofthem having in common that they have at least one at leastpartially downwardly facing shoulder. The fuel rods 26 areinserted through the spacers 28 to contact the upper side of the perforated bottom plate 29. The plate 29 has only a supporting function and therefore, as opposed to conventional end plates, is not provided with accurately positioned holes for the lower end plugs 32 of the fuel rods 26 since the positioning function has been assumed by the lowermost of the spacers 28. The absorber finger guide tubes 27 are attached to and extend upwardly from the perforated bottom plate 29, on the lower side of which are inlet throttling means coaxial with the guide tubes 27 in the form of stub tubes 37 having a smaller inner diameter than the guide tubes 27. These inlet throttling means provide such flow resistance that a substantially constant flow of coolant is obtained through the guide tubes 27 irrespective of how far the control rod 20 is withdrawn with respect to the fuel rod bundle 25.*

Figure 18:
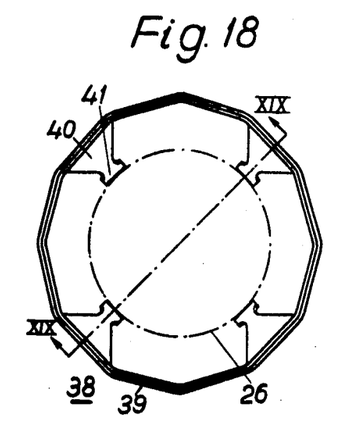
FIG. 18 shows an end view of a spacer element.
Figure 19:
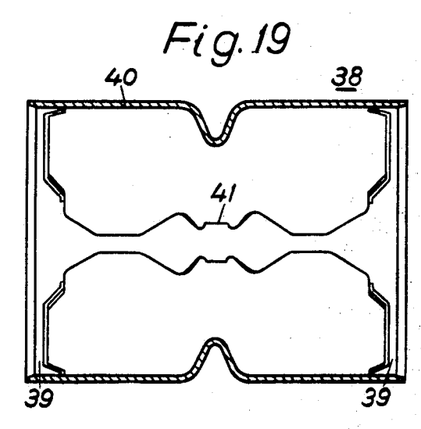
FIG. 19 shows in longitudinal section the spacer element according to the line XIX—XIX in FIG. 18.

Each spacer 28 is surrounded by a spacer frame and comprises a multitude of spacer elements 38, each of which surrounds a fuel rod 26. The spacer element 38, shown in more detail in FIGS. 18 and 19, comprises two identicaldodecagonal rings 39 surrounding the fuel rod, saidrings being spaced from each other and connected to each other by four elongate, strip-shaped, vertical spacer springs 40 distributed evenly round the fuel rod and having varying strip width and protuberances 41 abutting said fuel rods. The spacer frame is trapezium corrugated so that it follows three consectuive sides in each of the outer dodecagonal spacer elements 38 with the exception of the corner positions in which, in a hexagonal lattice, the spacer frame follows five consective sides and then continues to the next adjacent spacer element 38. It may be provided with holes, but in the embodiment in which thefuel assembly 19 has no shroud, it is advsiable for it to be whole. It is then suitable forthespacer frame to behigher than the spacer elements 38 and for its upper and lower edges to bebent in towards thefuel rod bundle 25 so that the spacer frames of adjacent fuel assemblies do not hook into each other when a core unit is being lifted or lowered. A high spacer frame also dampens any possible flow-included oscillations of thefuel assemblies, assuming that the spacers of adjacent fuel assemblies are arranged at the same levels. If two spacer frames at the same level are moved together, thewaterin the gap 21 between them must be forced away and if they are movedapart, the water must be sucked in. The damping effect increases with increased height of the spacer frame or increased area ofplates or the like attached to the frame. Even if a few of the assemblies lack shrouds, it is advantageous to arrange adjacent fuel assemblies in such a way that the corrugation ofone spacer frame engages in the corrugation of an adjacent spacer frame or shroud side.

Figure 6:
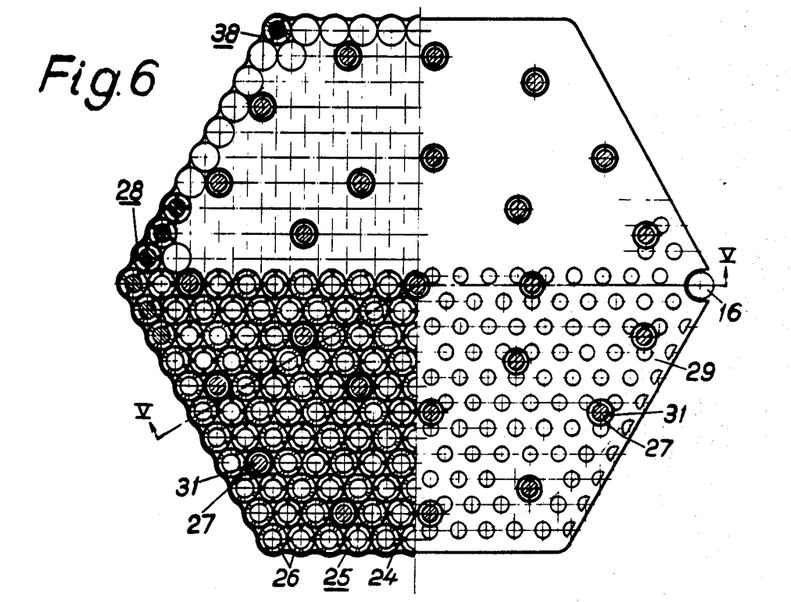
FIG. 6 shows a cross-section through the fuel assembly of the core unit along the line vi—VI in FIG. 5b.

The spacers 28 are attached to the guide tubes 27 for the absorber fingers. Since the guide tubes 27 are thin-walled, the wall thickness is about 0.5 mm, it is suitable for the spacers 28 to be attached with the help of a reinforcing tube 42. This may then comprise an upper and a lower half which may have different heights, or be provided with recesses to permitthe spacer springs 40 in spacer elements 38 abutting the reinforcing tube 42 to spring out from the fuel rods 26. In order to achieve the desired yielding hold of the fuel rods 26 it is necessary when stacking the spacer elements 38 laterally to a spacer to ensure that each spacer spring 40 can spring out from its fuel rod 26 without meeting any obstruction, for example a spacer spring in an adjacent spacer element 38, an absorber finger guide tube 27 or a reinforcing tube 42. A method of stacking the spacer elements 38 regularly, which is to be preferred from theinspection point of view, is shown in the lower lefthand part of FIG. 6.

The fingertype control rod 20 comprises 25 vertical, parallel fingers, 24 of which are absorber fingers 31 and one of which is an axially somewhat movable central rod 43 which, of course, may be an absorber finger, but preferably consists of stainless steel The absorber fingers 31 are equal in length and are arranged substantially in two circles concentric with the central rod in such a way that there are nine in the inner circle and 15 in the outer circle.

Figure 8:
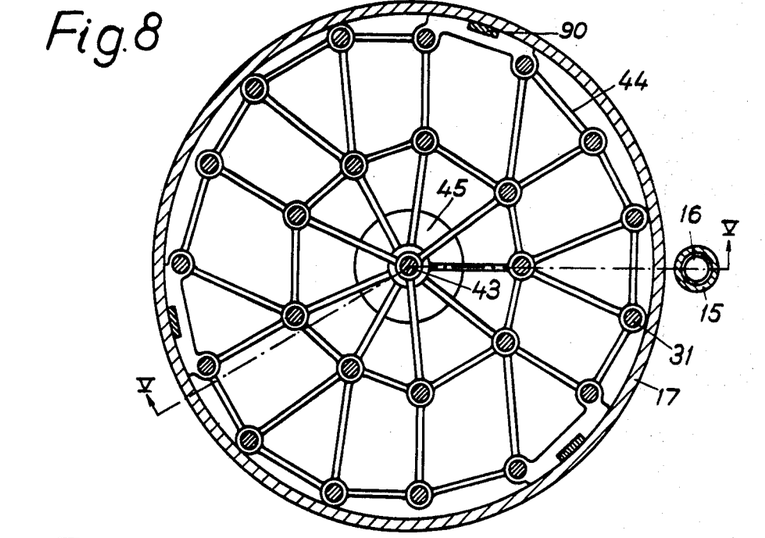
FIG. 8 similarly shows a cross-section through the control rodguide tube and the absorber fingers and also a view from above the finger holder according to the line VIII—VIII in FIG. 5c.

The lower ends of the absorber fingers 31 are screwed firmly into a finger holder 44 of frame structure. The finger holder 44 is seen most clearly in FIGS. 5c and 8. A central shaft 45 projects vertically downwards from the finger holder 44 and is provided at its lower end with a first coupling part 46 for coupling to a second coupling part 47 carried by a drive rod 48 belonging to the driving means 14 for the control rod. The control rod shaft 45 is a long so that the drive rod 48 shall not be subjected to much radiation.

Figure 5C:
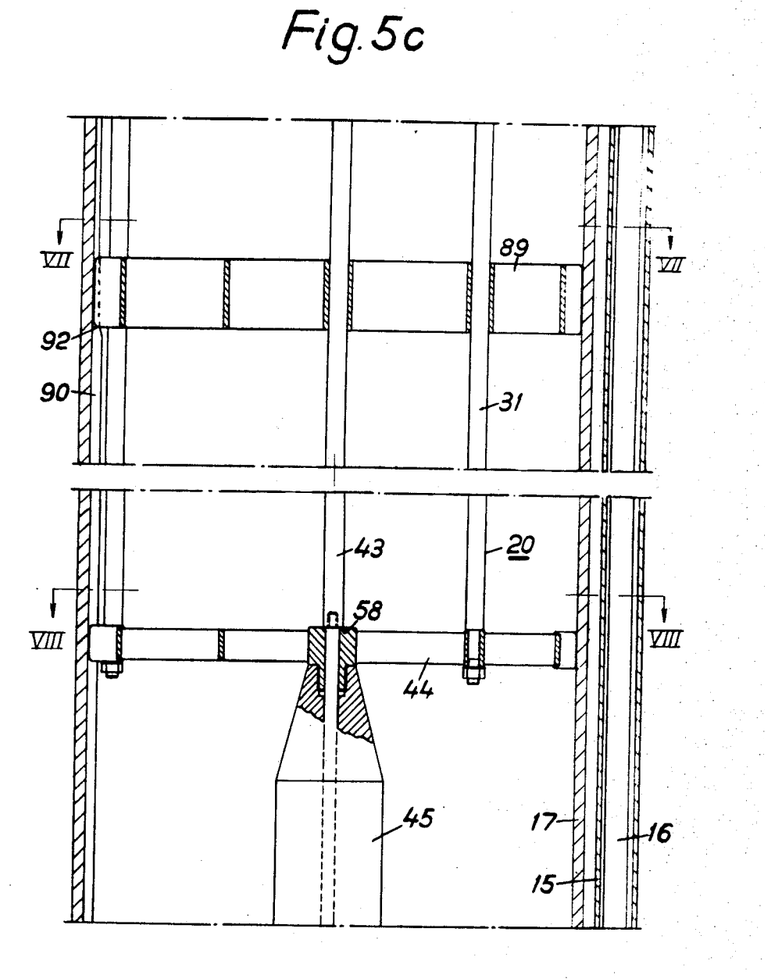
Figure 5D:
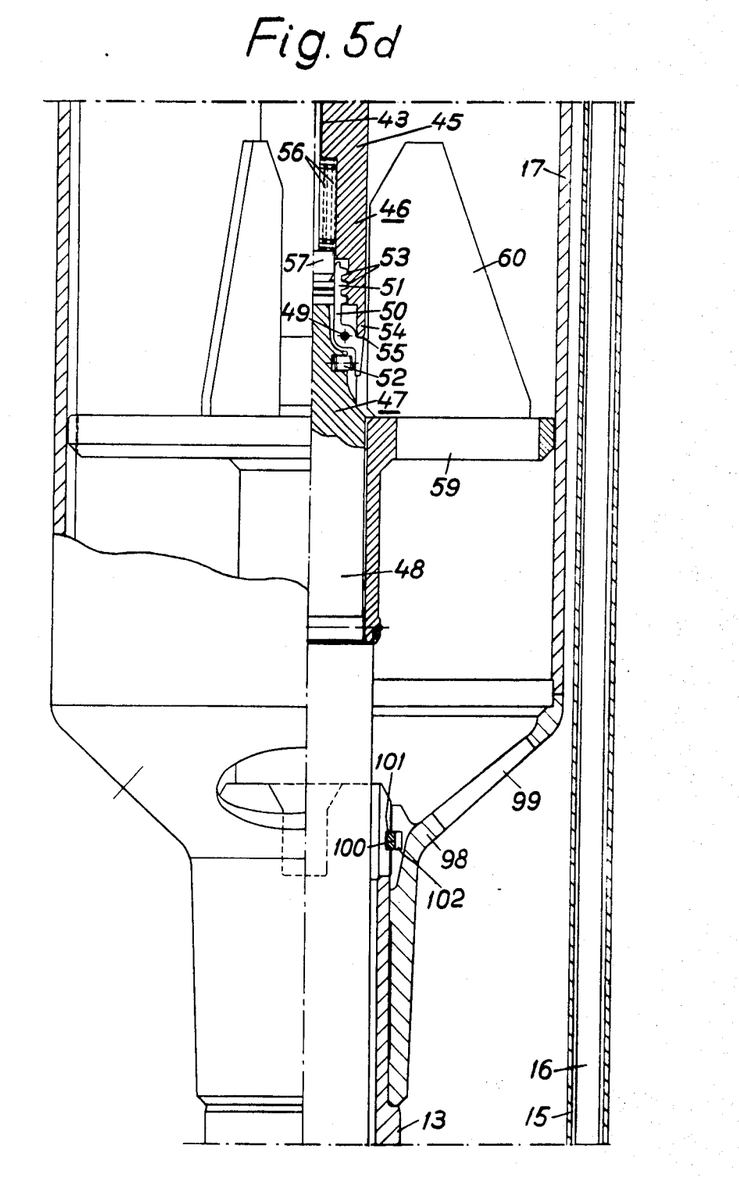

FIG. 5d shows an embodiment in which the coupling part 47 carries radially movable coupling elements in the form of hooks 50 pivoted on horizontal shafts 49 and having an upper toothed part 51. The hooks are spring-loaded (52) against non-engagement position. The coupling part 46 is provided with counter elements in the form of grooves 53 for engagement with the toothed part 51 of the hooks 50. A tubular collar 54 projecting from thecoupling part 46, upon insertion of the core unit towards the coupling part 47 when a core unit is being exchanged, will abutprojections 55 arranged on thehooks 50, so that thehooks swing from non-engagement position to the engagement position shown in FIG. 5d with the toothed part 51 of the hook in engagement with thegrooves 53. The central rod 43 is so long that its upper endprojects axially from the upper end of thefuel rod bundle 25 when the control rod is completely inserted. A spring 56, which for safety reasons should be duplicated, presses the lower part of the central rod, which is shaped as a locking head 57, downwards to a locking position in which thehooks 50 cannot leave the engagement position. A stop 58 arranged on the central rod 43 normally rests against the finger holder 44 and prevents the rod 43 from moving further downwards. A coupling guideplate provided with holes and arranged on the drive rod 48, guides the drive rod in the control rod guide tube 17 and carries axially extending plates 60 to guide the coupling part 46 towards the coupling part 47 when a core unit is being exchanged.

Figure 9:
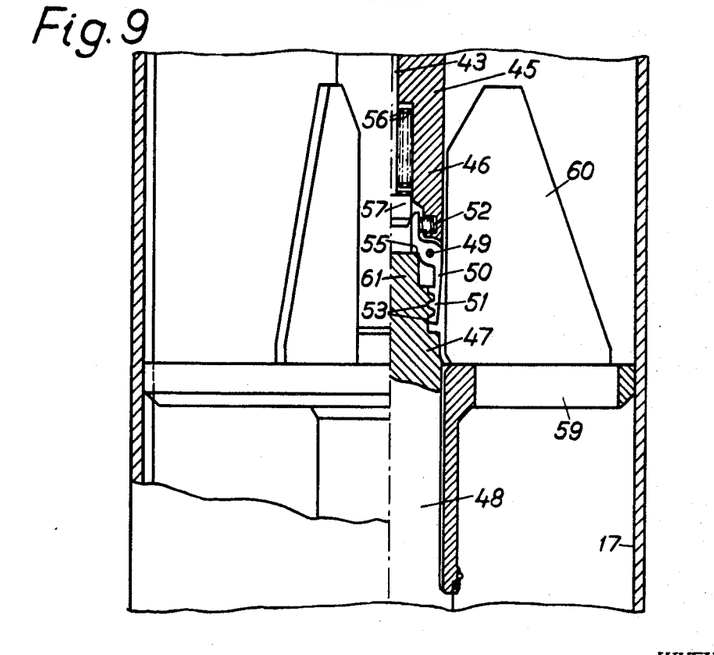
FIG. 9 shows, partly in longitudinal section, an alternative embodiment of the coupling shown in FIG. 5d.

FIG. 9 shows a variation of the coupling in FIG. 5d which differs from this in that the pivoted hooks 50 in this case pertain to the coupling part 46, thegrooves 53 in this case pertain to the coupling part 47 and a central peg 61 on the coupling part 47 replaces the tubular collar 54 projecting from the coupling part 46.

FIGS. 10 and 11 show yet another variation of the coupling. Thepivoted hooks 50 are replaced by balls 62 which are movable in through holes 63 inclined inwards and downwards in the lower part of the coupling part 46, which is tubular. the upper part of the coupling part 47 is similarly tubular and provided with an inner circular groove 53. The balls 62 are prevented from leaving the hole 63 at the bottom since the upward movement of the locking head 57 is limited by completely compressed spring 56 or a stop 64 which, when the locking head is lifted, rests against the coupling part 46, and in outward direction by a ring 65 set into the coupling part 46 and having a lip 66 which limits the area of the hole 63. The end surface 67 of the tubular part of the coupling part 46 is bevelled and acts partly as guide surface when the coupling parts 46 and 47 are brought together and partly as contact surface to the coupling part 47 to give the coupling parts substantially the correct position in relation to each other at the precise coupling moment.

Figure 13:
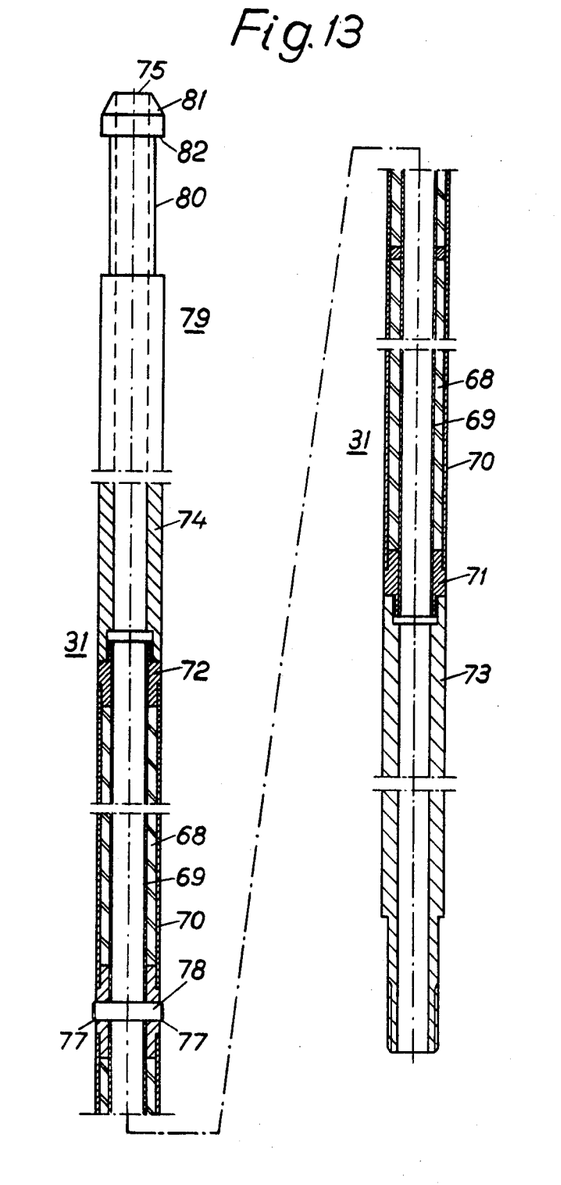
FIG. 13 shows, partly in longitudinal section, a tubular absorberfinger.
Figure 14:
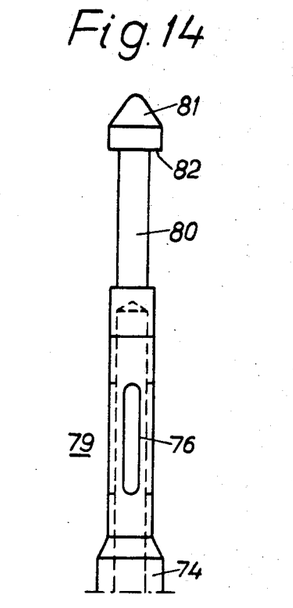
FIGS. 14 and 15 shows different ways of arranging outlet openings from the inside of the tubular absorber finger.
Figure 15:
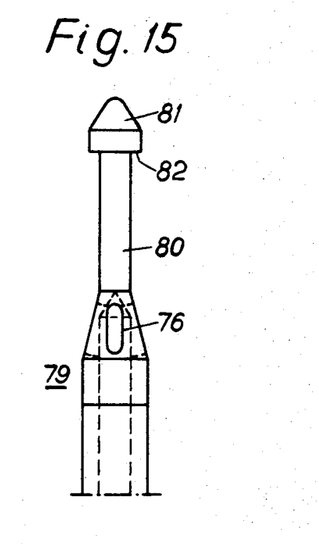

The absorber fingers 31 shown in FIG. 5 are solid and consist of tubes with a filling of boron carbide. They are cooled by a flow of water in an annular gap between them and the surrounding guide tube 27 and the gap must therefore have a certain minimum width, for example 2 mm. The absorber fingers 31 are therefore so narrow that they may buckle. In order to reduce the tendency to buckle each absorber finger may be made tubular, as shown in FIG. 13. The boron carbide isin this case arranged between concentrical tubes 69 and 70 and the space between the tubes 69 and 70 is closed by hollow end plugs 71 and 72 with tubular extensions 73 and 74, respectively. The tubular extension 73 of the lower end plug 71 is provided at the bottom with a thread for screwing into the finger holder 44. A large amount of coolant can now be led inside the absorber fingers 31 which may have a straight outlet 75 in accordance with FIG. 13 or, for example, four side outlets 76 in accordance with FIGS. 14 and 15. The cooling gap to the surrounding guide tubes 27 can thus be decreased which in turn means that the diameterof the absorber fingers can be increased and the absorber fingerwill be more resistant to buckling. Other designs for the absorber fingers 31 and other absorbermaterial than boron carbide are also feasible.

The central rod 43 and each absorber finger 31 has an upper endpart 79 with a neck part 80 and a head part 81 having a downwardly facing shoulder 82. The central rod 43 and the absorber fingers 31 are of such length that when the control rod 20 is completely inserted, the end parts 79 project from the upper end of the fuel rod bundle 25. The shoulder 82 on the central rod 43 provides a grip for a lifting tool to disengage the coupling, and the shoulders 82 on the absorber fingers 31 provide a grip for a lifting tool to lift the entire core unit 18. It is suitable if the shoulder 82 on the upper end part 79 of the central rod 43 is arranged at one level and the shoulders 82 on the upper end parts 79 of the absorber fingers 31 at another, higher level and if the distance between the levels is greater than the distance which the central rod 43 must be lifted to disengage the coupling, butless than the distance available forlifting said central rod between its lower locking position and an upper endposition. This makes possible the use of simply constructed tool for lifting the core unit, which tool may have all its gripping members arranged in one plane. When, after inserting the lifting tool, a lifting process is started, first only the central rod 43 is raised, but when itsshoulder 82 is on a level with the shoulders 82 of the absorber fingers 31 the tool lifts the core unit in all the end parts 79.

Figure 12F:
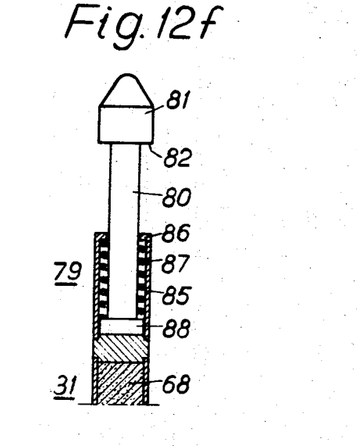

It is obvious that many different types of end parts can offer gripping possibilities and FIGS. 12a –e illustrate some of these which have in common that they all have at least one at least partially downwardly facing shoulder 82. In FIGS. 12, a b, c and e the end part 79 comprises a neck part 80 and a head part 81. In FIG. 12a the shoulder 82 is smooth, annular and downwardly directed, in FIG. 12b it is truncated cone-shaped and directed downwards-outwards, in FIG. 12c the head part 81 is spherical and the shoulder 82 consists of a transverse cylindrical pin so that two shoulders 82 are obtained. In the embodiment according to FIG. 12d the end part 79 comprises a tubular collar 83 with three internal circular grooves 84 thus forming three downwardly inwardly directed shoulders 82. In order to ensure when lifting the core unit 18 that the load is evenly distributed over the absorber fingers 31, their end parts 79 may be constructed as shown in FIG. 12f. In this embodiment the shoulder 82 is resilient upwards with respect to the absorber finger 31 since the end part 79 comprises a tubular collar 85 with a flange 86 projecting inwardly at the top and a spring 87 arranged between the flange 86 and a piston-like foot part 88 arranged at the bottom of the neck part 80.

Figure 7:
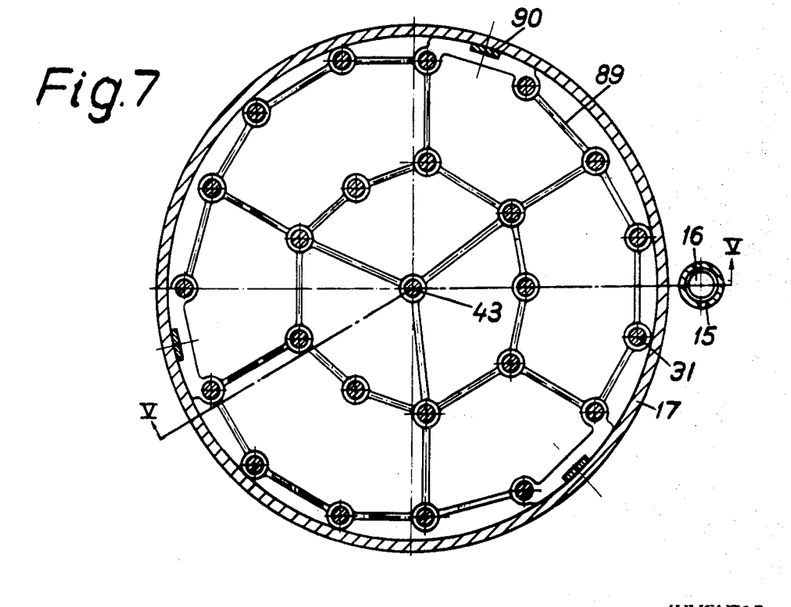
FIG. 7 shows a cross-section through the control rodguide tube and the absorber fingers and a view over the movable guide plate along the line VII—VII in FIG. 5c.
Figure 16:
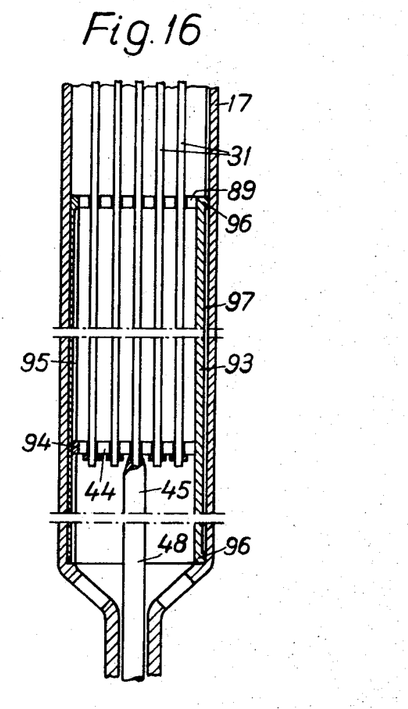
FIG. 16 shows in longitudinal section an alternative embodiment of the movable guide membershown in FIG. 5c.

As mentioned above, the absorber fingers 31 are so slim in relation to their length that they risk being buckled if the finger type control rod 20 is inserted rapidly. In order to be sufficiencly strong the absorber fingers 31 may in certain cases need to have such diameter that they would not fit into a fuel rod position. By arranging at least one axially movable guide member, for example a guide plate 89, in the control rod guide tube 17, however, the diameter of the absorber finger 31 may be selected substantially arbitrarily without there being a risk of buckling. the movable guide member 89 shown in FIGS. 5c and 7 comprises a guide plate of frame structure and is similar to the fingerholder 44, but may have a smaller number of cross bars than this and greater height. The movable guide plate 89, like the attachment plate 44 and the coupling guide plate 59 on the drive rod 48, is guided by means of three guide rods 90 running inside the control rod guide tube 27, and their extensions 91 on the inside of the lower circular elongate end part 22 of the fuel assembly 19. If a single movable guide plate 89 is used, this rests on the finger holder 44 and follows its movements if the control rod 20 is inserted more than half the stroke length. Under other conditions the movable guide plate 89 is held in its lower end position by its own weight. To ensure that the movable guide plate 89 returns to its lower end position, the central rod 43 or the absorber fingers, or both, may be provided with stops or the like which catch into the guide plate 89 and pull it down. FIG. 13 shows an absorber finger 31 provided with stops 77 in the form of projecting lower edges on a pin 78 arranged transversely through the absorber finger 31. the lifting force caused by a pressure drop in the coolant flowing up through the control rodguide tube is considerably less than the weight of the guide plate 89 if this has a suitable construction. In FIG. 5c the movable guide plate 89 rests in its lower end position on stops 92 on the guide rods 90, but it is clear that such stops can be arranged directly on the inner wall of the control rodguide tube 17. the movable guide plate 89 may also rest on legs extending downward to the lower part of the control rodguide tube 17 or be suspended on guide rods from the fuel assembly. Of course, with all these arrangements the finger holder 44 must still be movable along the entire stroke length. In order to decrease the impact when the finger holder 44 at rapid insertion hits the movable guide plate 89 at full speed, the finger holder 44 and the movable guide plate 89 may be provided with cooperating members which together from a hydraulic shock absorber. Springs may also be used forthis purpose. FIG. 16 shows an embodiment where the movable guide member 89 comprises a long tube 93 projecting down along the inner wall of the control rod guide tube 17 and resting in the lower end position of the guide member 89 against the lower part of the control rod guide tube 17. The finger holder 44 is by means of pegs 94 guided in axial grooves 95 in the inner wall of the tube 93, and the tube 93 is in turn by means of pegs 96 guided in axial grooves 97 in the inner wall of the control rod guide tube 17.

The control rod guide tube 17 has a lower transition part 98 for connection to the control drive guide tubes 13. The transition part 98 is provided with inlet holes 99 for the coolant to be supplied to the fuel assembly. A slotted tension ring 200 is arranged in two opposite slots 101 and 102 in the control drive guide tube 13 and the transition part 98, respectively, in order to achieve a remote-controlled detachable connection between these components (13 and 98). The slot 101 has a depth corresponding to half the width of the tension ring and the slot 102 is twice as deep. When the core unit has been lifted out and the coupling guide plate 59 of the drive rod 48 has been dismounted the tension ring 200 can be pressed into the slot 102 by means of a remote-controlled tool so that the control rod guide tube 17 is disengaged from the control drive guide tube 13.

The neutron flux measuring probes 16 are so elongate and so slim that they fit into any fuel rod positioning the lattice and they are arranged in corner positions in the fuel assemblies 19 in such a way that all probes 16 have the same orientation with respect to respective fuel assemblies 19 so that the probes are distributed evenly over the core 1. The probe 16 leaves the fuel assembly 19 through the lower end of the shroud 24 and then runs parallel with the control rod guide tube 17 inside the leading-in tube 15 which in this case guides the probe 16. The probes 16 are axially movable. When a core unit 18 is to be exchanged, the probe 16 is first drawn downwards out of the fuel assembly 19, after which the exchange can be carried out. the probe is then moved upwards again to its place in the new fuel assembly 19.

We claim:

1. A nuclear reactor comprising a reactor pressure vessel (8), a reactor core (1) surrounded by said pressure vessel, said pressure vessel having a plurality of fuel assemblies (19) with polygonal cross-section, a plurality of control means located under the core, each control means comprising a finger control rod (20) having a top end, a bottom end and a finger holder (44) at the bottom end, a control rod drive (14), releasable means (51,53) connecting the control rod drive to said finger holder, remote-controlled means (43,57) for releasing said connecting means and a plurality of vertical tubes (13) located under the core, the upper part of each of these tubes forming a guide tube (17) for one of said finger control rods, in which the top end of each finger control rod is shaped with at least one shoulder (82)

facing at least partially downwards and arranged to provide a grip for a lifting tool, and the core is built up of a plurality of core units (18)arranged close to each other with substantially no gap laterally between them, each core unit comprising one of said fuel assemblies and one of said finger control rods, means (29,37)for transmitting lifting force from said finger holder to a corresponding fuel assembly after a releasing of said connecting means by said remote-controlled means.

2. The nuclear reactor of claim 1, in which each fuel assembly comprises a shroud having a substantially polygonal cross-section and a fuel rod bundle having a plurality of parallel fuel rods having upper and lower ends, said fuel rods being arranged in a plygonal lattice, said shroud surrounding said fuel rod bundle, said shroud having corrugated sides substantially following the contours of the fuel rods, said corrugated sides of said shroud engaging in the corrugated sides of adjacent shrouds.

3. The nuclear reactor of claim 2, in which at least amajority of said fuel assemblies each has an elongate neutron flux measuring probe in a corner position of said polygonal fuel rod lattice, all probes being identically orientated in relation to the respective fuel assembly, said probes being distributed evenly over said core and each probe being axially movable into and out of the fuel assembly.

4. Nuclear reactor according to claim 1, in which each finger control rod comprises a plurality of parallel absorber fingers of equal length, a finger holder at the lower end of the absorber fingers holding the lower ends thereof, said resiliently operated connecting means including a first coupling part carried by said finger holder and a second coupling part carried by the control rod drive, and each fuel assembly comprising a fuel rod bundle having a plurality of parallel fuel rods arranged in a polygonal lattice and guide tubes for said absorber fingers arranged at fuel rod positions in said lattice, in which one of said coupling parts has substantially radially movable coupling elements and the other coupling part has counter elements for engagement with the radially movable coupling elements and the other coupling part has counter elements for engagement with the radially movable coupling elements, and the releasing means comprises a central rd passing through the coupling part of the finger holder, said upper end of the rod, when the absorber fingers are completely inserted into the fuel assembly, projecting axially from the upper end of the fuel rod bundle and the lower end of the rod forming a locking member for said radially movable coupling elements when said elements are in an engagement position, said central rod having a lower locking position from which it is axially movable upwards to disengage said coupling.

5. Nuclear reactor according to claim 4, comprising a locking head arranged in the lower end of the central rod, a spring arranged to press the locking head down into the locking position, a stop arranged to prevent the locking head from being pressed further down than to the locking position and at least one shoulder facing at least partially downwards arranged in the upper end of the central rod to provide a grip for a lifting tool to lift the rod from the locking position.

6. The nuclear reactor of claim 4, in which said central rod runs inside said fuel rod bundle in a guide tube, said guide tube being located on a central fuel rod position in said lattice, said guide tube having an inlet throttling means giving a substantially constant flow of coolant through said guide tube irrespective of how far said central rod is withdrawn with respect to said fuel rod bundle.

7. The nuclear reactor of claim 4, in which at least some of said absorber fingers have upper end parts which, when said absorber fingers are completely inserted into said fuel assembly project axially from the upper end of thefuel rod bundle, each such upper end part carrying a shoulder facing at least partially downwards, said shoulder providing a grip for a lifting tool to lift said core unit.

8. The nuclear reactor of claim 7, in which said upper end part of each absorber fingeris in axial direction yieldingly attached to an absorbing part of said absorber finger.

9. The nuclear reactor of claim 7, in which said shoulder on said upper end part of the central rod is located at one level and said shoulders on said upper ends parts of the absorber fingers at another, higher level, the distance between said levels being greater than the distance which said central rod must be lifted to disengage said coupling, but less than the distance available for lifting said central rod between its lower locking position and an upper end position.

10. The nuclear reactor of claim 4, in which each absorber finger guide tube has an inlet throttlingmeans giving a substantially constant flow of coolant through said guide tube irrespective of how far said absorber finger is withdrawn with respect to said fuel rod bundle.

11. The nuclear reactor of claim 4, in which each absorber finger has an inner flow channel for coolant.

12. The nuclear reactor of claim 4, in which each fuel assembly further comprises a plurality of spacers arranged at different levels and firmly attached to said absorber finger guide tubes, said spacers comprising elastically yielding members resiliently abutting each of said fuel rods at at least three contact points on each spacer level, said fuel assembly further comprising a transverse support member rigidly attached to said shroud at a level immediately below said lower ends of the fuel rods and permitting the passage of coolant, said fuel rods being inserted through the spacers to contact an upper side of said transverse support member, each fuel rod being held in an intended position solely by said spacers and said transverse support member, each fuel rod having an upper end part, each such upper end part carrying at least one shoulder facing at least partially downwards, said shoulder providing a grip for a lifting tool for extracting said fuel rod, thus enabling each individual fuel rod to be exchanged both separately and in a group.

13. The nuclear reactor of claim 12, in which said transverse support memberis a perforated plate, said absorber finger guide tubes being rigidly attached to said plate.

14. The nuclear reactor of claim 12, in which each spacer comprises a plurality of spacer elements, each spacer element surrounding one of said fuel rods, each spacer element comprising two identical dodecognal rings surrounding said fuel rod, said rings being spaced from each other and connected to each other by four elongated, strip-shaped, vertical spacer springs evenly distributed around the fuel rod, said strip-shaped springs having varying strip width and having protuberances abutting said fuel rods.

15. The nuclear reactor of claim 14, in which said fuel rods are arranged in an equilateral triangular lattice and each absorber finger guide tube supports six surrounding spacer elements at each spacer level, said spacer elements being stacked laterally, there being at each spacer level only one spacer spring on a straight line between the center of one of said fuel rod positions in the lattice and the center of an adjacent fuel rod position in said lattice, said spacer springs having parts with a certain freedom of movement along said straight line with respect to a normal position.

16. The nuclear reactor of claim 4, in which said absorber fingers of each control rod, during insertion into said fuel assembly, are supported laterally by at least one guide member, said guide member being movable in said control rod guide tube between an upper end position and a lower end position.

17. The nuclear reactor of claim 9, in which said movable guide member runs along at least three guide rods extending along the innerwall of the control rod guide tube, each guide rod having a stop, said movable guide member in its lower end position resting against said stops.

18. The nuclear reactor of claim 16, in which said movable guide member carries at least one elongated member projecting axially downwards, said elongated member being separated from said control rod guide tube by a narrow gap said elongated member resting when said movable guide member is at its lower end position, against a stop arranged in the lower end of the absorber finger guide tube.

* * * * *